US012606889B2

(12) United States Patent
Tang et al.

(10) Patent No.: US 12,606,889 B2
(45) Date of Patent: Apr. 21, 2026

(54) ALLOY WIRE ROD AND PREPARATION METHOD AND APPLICATION THEREOF

(71) Applicant: Xiamen Honglu Tungsten Molybdenum Industry Co., Ltd., Xiamen (CN)

(72) Inventors: Minfeng Tang, Xiamen (CN); Yijin Fang, Xiamen (CN); Sheng Lv, Xiamen (CN); Donghong Guo, Xiamen (CN); Xianyue Wu, Xiamen (CN); Fusheng Peng, Xiamen (CN)

(73) Assignee: Xiamen Honglu Tungsten Molybdenum Industry Co., Ltd., Xiamen (CN)

( * ) Notice: Subject to any disclaimer, the term of this patent is extended or adjusted under 35 U.S.C. 154(b) by 480 days.

(21) Appl. No.: 18/248,592

(22) PCT Filed: Aug. 27, 2021

(86) PCT No.: PCT/CN2021/114939
§ 371 (c)(1),
(2) Date: Apr. 11, 2023

(87) PCT Pub. No.: WO2022/156216
PCT Pub. Date: Jul. 28, 2022

(65) Prior Publication Data
US 2023/0374634 A1 Nov. 23, 2023

(30) Foreign Application Priority Data
Jan. 20, 2021 (CN) .......................... 202110077980.5

(51) Int. Cl.
| | |
|---|---|
| *C22C 27/04* | (2006.01) |
| *B22F 5/12* | (2006.01) |
| *B23D 61/18* | (2006.01) |
| *C21D 9/52* | (2006.01) |
| *C22C 1/059* | (2023.01) |

(52) U.S. Cl.
CPC ................ *C22C 27/04* (2013.01); *B22F 5/12* (2013.01); *B23D 61/185* (2013.01); *C21D 9/525* (2013.01); *C22C 1/059* (2023.01); *B22F 2301/20* (2013.01); *B22F 2302/25* (2013.01)

(58) Field of Classification Search
CPC ..... C22C 27/04; C22C 32/0031; C22C 1/059; B22F 5/12; C21D 9/525; B23D 61/185
See application file for complete search history.

(56) References Cited

U.S. PATENT DOCUMENTS

| | | |
|---|---|---|
| 5,028,756 A | 7/1991 | Ezaki et al. |
| 2018/0326519 A1 | 11/2018 | Kanazawa et al. |
| 2018/0361017 A1 | 12/2018 | Roth |
| 2019/0006050 A1 | 1/2019 | Kavecky et al. |

FOREIGN PATENT DOCUMENTS

| | | | |
|---|---|---|---|
| CN | 101049613 A | 10/2007 | |
| CN | 102000923 | 4/2011 | |
| CN | 102424941 A | 4/2012 | |
| CN | 102586663 A | 7/2012 | |
| CN | 102816963 A | 12/2012 | |
| CN | 103173641 A | 6/2013 | |
| CN | 103526096 A | 1/2014 | |
| CN | 103560061 A | 2/2014 | |
| CN | 103740994 A | 4/2014 | |
| CN | 103849804 A | 6/2014 | |
| CN | 106834780 A | 6/2017 | |
| CN | 106906396 A | 6/2017 | |
| CN | 107009093 A | 8/2017 | |
| CN | 107322002 A | 11/2017 | |
| CN | 108858837 A | 11/2018 | |
| CN | 109226748 A | 1/2019 | |
| CN | 110396630 A | 11/2019 | |
| CN | 209955028 U | 1/2020 | |
| CN | 110871649 A | 3/2020 | |
| CN | 111041315 A | 4/2020 | |
| CN | 113186438 A | 7/2021 | |
| DE | 3835328 C1 | 12/1989 | |
| EP | 0651065 A1 * | 5/1995 | ........... B23K 35/222 |

(Continued)

OTHER PUBLICATIONS

Lassner, Erik, and Wolf-Dieter Schubert. "Tungsten alloys." Tungsten: Properties, Chemistry, Technology of the Element, Alloys, and Chemical Compounds. Boston, MA: Springer US, 1999. 255-282.*
Han, et al., "Densification and Annealing Analysis of Multi-rare Earth Tungsten Wire Rolling", vol. 10, No. 1, Jan. 2020, 7 pages with English abstract.
Liu, et al. "Investigation of Fracture Failure and Strengthening-Toughing of Tungsten Based Alloys", vol. 17, No. 4, , Aug. 2007, 6 pages with English abstract.
International Search Report cited in PCT/CN2021/114939 mailed Nov. 17, 2021, 6 pages.
Written Opinion cited in PCT/CN2021/114939 mailed Nov. 17, 2021, 4 pages.

(Continued)

*Primary Examiner* — Jessee R Roe
(74) *Attorney, Agent, or Firm* — Cooper Legal Group, LLC

(57) ABSTRACT

The present disclosure relates an alloy wire rod and a preparation method and application thereof. The alloy wire rod is made of a tungsten alloy, and the tungsten alloy contains tungsten and an oxide of lanthanum. The alloy wire rod has a wire diameter of equal to or less than 100 μm; and the alloy wire rod has a tensile strength of greater than 3,800 MPa. The wire diameter of the alloy wire rod is equal to or less than 60 μm; the diameter of a push-pull core wire of the alloy wire rod is less than 350 μm; the elastic ultimate strength of the alloy wire rod is greater than 2,500 MPa; and the tensile strength of the alloy wire is greater than 4,200 MPa. In the present disclosure, the alloy wire rod having ultra-high strength and good toughness is obtained by doping an oxide of lanthanum.

20 Claims, 1 Drawing Sheet

(56)  References Cited

FOREIGN PATENT DOCUMENTS

| EP | 0765949  | A1 | 4/1997  |
| EP | 1555331  | A1 | 7/2005  |
| JP | S63170843 | A | 7/1988  |
| JP | S63170844 | A | 7/1988  |
| JP | H02109640 | A | 4/1990  |
| JP | 11152534 | A | 6/1999  |
| JP | 2000328188 | A | 11/2000 |
| JP | 2002173731 | A | 6/2002  |
| JP | 2002356732 | A | 12/2002 |
| JP | 2011125961 | A | 6/2011  |
| JP | 2015003347 | A | 1/2015  |
| JP | 2018122599 | A | 8/2018  |
| JP | 2018167509 | A | 11/2018 |
| JP | 2018187741 | A | 11/2018 |
| JP | 2019530461 | A | 10/2019 |
| JP | 2020105548 | A | 7/2020  |
| JP | 2021030352 | A | 3/2021  |
| KR | 20110123066 | A | 11/2011 |
| TW | 202024348 | A | 7/2020  |
| WO | 2014203795 | A1 | 12/2014 |
| WO | 2017100257 | A1 | 6/2017  |
| WO | 2020137255 | A1 | 7/2020  |
| WO | 2020218058 | A1 | 10/2020 |

OTHER PUBLICATIONS

International Search Report cited in PCT/CN2021/138514 mailed Mar. 8, 2022, 6 pages.
Written Opinion cited in PCT/CN2021/138514 mailed Oct. 15, 2021, 3 pages.

* cited by examiner

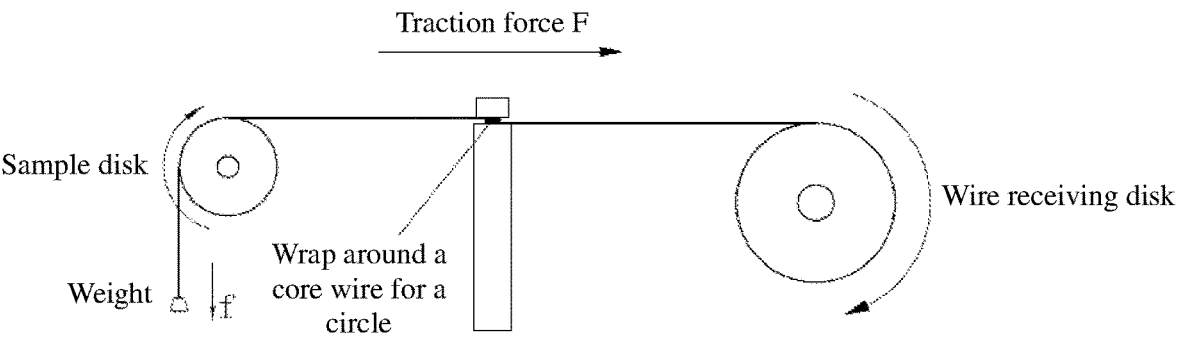

ALLOY WIRE ROD AND PREPARATION METHOD AND APPLICATION THEREOF

TECHNICAL FIELD

The present disclosure relates to the technical field of tungsten alloy materials, and in particular to an alloy wire rod and a preparation method and application thereof.

BACKGROUND

Existing materials having certain high strength and hardness include high-carbon steel wires, tungsten wires and the like. However, the existing high-carbon steel wires generally have a tensile strength of less than 4,500 MPa and a diameter of greater than 50 μm, and have reached the processing limit, so that the high-carbon steel wires cannot be processed to reach a lower diameter.

In addition, tungsten has unmatched flexibility at a bending radius of less than 1 mm, while stainless steel wire ropes may fail at the same extremely small bending radius due to bending stresses in multiple cycles. In contrast, 316 stainless steel melts at a temperature of 2,500-2,550° F., while the tungsten melts at a temperature of 6,192° F. It can be seen that the tungsten still performs well in application of mechanical wire ropes requiring good temperature resistance and excellent tensile strength.

Meanwhile, due to two main advantages including long service life and flexibility, the tungsten has gradually become a material with more performance advantages for manufacturing of miniature mechanical wire ropes for medical and industrial use. Due to properties of strength, toughness, flexibility and high-temperature resistance of the tungsten, tungsten wire ropes made from the tungsten are strong and durable, and do not require maintenance or replacement over a long period of time. First, the tungsten is one of strongest and toughest materials known to people. Diamonds have a Mohs hardness of 10, the tungsten has a Mohs hardness of 9, and in contrast, the stainless steel has a Mohs hardness of about 6.

Conventional tungsten wires generally have a tensile strength of less than 4,000 MPa. However, since the conventional tungsten wires have poor toughness and a complex production process and are extremely difficult to process, effective mass production is difficult to realize. Therefore, a wire rod which is suitable for mass production and has high strength, high toughness and a tensile strength of greater than 4,500 MPa has not been sold on the market. However, in application of cutting of high-hardness materials, such as semiconductor materials including sapphire, silicon carbide, silicon wafers and magnetic materials, and cables or ropes for traction of high-precision instruments and high-temperature furnaces, a fine wire having higher strength, toughness and fineness is needed, so as to meet various actual needs in practical application in the field.

SUMMARY

In order to solve the problem mentioned in the background that existing high-strength tungsten alloy wire rods have performance defects at different sizes, the present disclosure provides an alloy wire rod. The alloy wire rod is made of a tungsten alloy, and the tungsten alloy contains tungsten and an oxide of lanthanum. The alloy wire rod has a wire diameter of equal to or less than 100 μm; and the alloy wire rod has a tensile strength of greater than 3,800 MPa.

Further, the content of the oxide of lanthanum in the alloy wire rod is 0.1-2.0 wt %.

Further, the alloy wire rod has a wire diameter of equal to or less than 60 μm; the diameter of a push-pull core wire of the alloy wire rod is less than 350 μm;

the alloy wire rod has an elastic ultimate strength of greater than 2,500 MPa; and the alloy wire rod has a tensile strength of greater than 4,200 MPa.

Further, the tungsten alloy further contains a metallic element M, and the metallic element M is selected from at least one of potassium, rhenium, molybdenum, iron, cobalt or rare earth metals.

Further, the content of potassium is less than 80 ppm.

Further, the tungsten alloy further contains one or more of rare earth oxides other than the oxide of lanthanum.

The present disclosure provides a preparation method of the alloy wire rod as mentioned above. The preparation method includes doped powder making, pressing, sintering, and cogging, where the cogging includes conducting cogging on a sintered billet by a multi-roll rolling way so that the ratio of the longitudinal length of particles of the oxide of lanthanum in a rolled tungsten rod along the wire rod to the particle size of the cross section of the particles is greater than 5.

Further, the doped powder making includes the following steps:

solid-liquid doping, reduction, and powder making, where the solid-liquid doping includes conducting staged drying on a mixed tungsten-doped solution, the staged drying at least includes 2 temperature stages, and the 2 temperature stages are divided with 100° C. as a division line and include heat drying below 100° C. first and then heat drying above 100° C.

Further, the staged drying in the solid-liquid doping includes a first drying stage and a second drying stage, the temperature of the first drying stage is 60-80° C., and the temperature of the second drying stage is 110-150° C.

Further, the reduction includes conducting reduction on a material obtained after the solid-liquid doping to obtain an alloy powder having an average Fisher particle size of 1.0-4.0 μm.

Further, the doped powder making includes the following step:

solid-solid doping, where the solid-solid doping includes using a tungsten powder having a Fisher particle size of 1.0-4.0 μm and an oxide of lanthanum having a particle size distribution D90 of less than 2.0 μm as raw materials, and conducting mixing to obtain a tungsten powder doped with an oxide of lanthanum.

Further, the particle size of the oxide of lanthanum in the sintered billet is less than 2.5 μm.

The present disclosure provides application of an alloy wire rod in the field of cutting of materials, where the alloy wire rod as mentioned above or an alloy wire rod prepared by the preparation method of the alloy wire rod as mentioned above is used as the alloy wire rod.

Further, the materials at least include hard surface materials; the hard surface materials at least include silicon wafers, magnetic materials, and semiconductor materials; and the semiconductor materials at least include sapphire and silicon carbide.

The present disclosure provides application of an alloy wire rod to cables/ropes, where the alloy wire rod as mentioned above or an alloy wire rod prepared by the preparation method of the alloy wire rod as mentioned above is used as the alloy wire rod.

Further, the cables/ropes are used for traction of medical/industrial precision instruments and high-temperature furnaces.

The present disclosure provides application of an alloy wire rod in the field of textiles, where the alloy wire rod as mentioned above or an alloy wire rod prepared by the preparation method of the alloy wire rod as mentioned above is used as the alloy wire rod.

Further, the application includes spinning or weaving the alloy wire rod into a glove or a protective suit.

Compared with the prior art, the alloy wire rod and a preparation method and application thereof provided by the present disclosure have the following beneficial effects.

1. The wire diameter is equal to or less than 100 μm, and the tensile strength is greater than 3,800 MPa.

2. The wire diameter of the alloy wire rod is equal to or less than 60 μm; the diameter of a push-pull core wire of the alloy wire rod is less than 350 μm; the elastic ultimate strength of the alloy wire rod is greater than 2,500 MPa; and the tensile strength of the alloy wire is greater than 4,200 MPa.

BRIEF DESCRIPTION OF DRAWINGS

In order to more clearly illustrate technical solutions in embodiments of the present disclosure or in the prior art, drawings required to be used in description of the embodiments or the prior art are briefly introduced below. Obviously, the drawings described below are some embodiments of the present disclosure, and other drawings can also be obtained by persons of ordinary skill in the field without any creative effort according to these drawings.

FIG. 1 is a structural schematic diagram of a push-pull toughness testing device provided by the present disclosure.

DESCRIPTION OF EMBODIMENTS

In order to make the purposes, technical solutions and advantages of the embodiments of the present disclosure more clear, the technical solutions in the embodiments of the present disclosure are clearly and completely described below in combination with the drawings attached to the embodiments of the present disclosure. Obviously, the embodiments described are merely a part, rather than all of the embodiments of the present disclosure. Based on the embodiments of the present disclosure, all other embodiments obtained by persons of ordinary skill in the field without any creative effort shall fall within the protection scope of the present disclosure.

The present disclosure provides an alloy wire rod. The alloy wire rod is made of a tungsten alloy, and the tungsten alloy contains tungsten and a rare earth oxide;

the alloy wire rod has a wire diameter of equal to or less than 400 μm;

and the alloy wire rod has a tensile strength of greater than 2,800 MPa.

In some embodiments, the wire diameter of the alloy wire rod is equal to or less than 100 μm; and the tensile strength of the alloy wire rod is greater than 3,800 MPa.

In some embodiments, the wire diameter of the alloy wire rod is equal to or less than 60 μm; the diameter of a push-pull core wire of the alloy wire rod is less than 350 μm;

the alloy wire rod has an elastic ultimate strength of greater than 2,500 MPa; and the alloy wire rod has a tensile strength of greater than 4,200 MPa.

In some embodiments, the wire diameter of the alloy wire rod is equal to or less than 40 μm; and the tensile strength of the alloy wire rod is greater than 4,800 MPa.

In some embodiments, the wire diameter of the alloy wire rod is equal to or less than 25 μm; and the tensile strength of the alloy wire rod is greater than 5,000 MPa.

The tensile strength of the alloy wire rod may be greater than 2,800 MPa. For example, the tensile strength of the alloy wire rod may also be greater than 3,200 MPa, greater than 3,800 MPa, greater than 4,200 MPa, or even greater than 4,800 MPa or 5,000 MPa.

In addition, the elastic ultimate strength of the alloy wire rod may be greater than 2,500 MPa. For example, the elastic ultimate strength of the alloy wire rod may also be greater than 2,700 MPa, greater than 3,000 MPa, or even greater than 3,200 MPa.

The wire diameter of the alloy wire rod may be less than 400 μm. For example, the wire diameter of the alloy wire rod is 400 μm, 350 μm, 300 μm, 250 μm, 200 μm, 150 μm, 100 μm, or 80 μm, and is even 60 μm, 40 μm, 25 μm, 20 μm, and 10 μm. The alloy wire rod may be uniform or incomplete uniform, and may also include differences of several percents, such as 1%, according to parts.

In particular, the wire diameter of the alloy wire rod may be equal to or less than 60 μm, so that the alloy wire rod has softness and can be easily bent thoroughly, and accordingly, the alloy wire rod can be easily wound.

Thus, the diameter of a push-pull core wire of the alloy wire rod may be less than 350 μm. For example, the diameter may be 230 μm, 200 μm, 180 μm, 160 μm, 130 μm and the like, indicating that the alloy wire rod also has excellent push-pull toughness.

Specifically, the wire diameter of the alloy wire rod is 200-400 μm, and the tensile strength of the alloy wire rod may be 2,800-4,000 MPa. For example, the tensile strength may be up to 3,000 MPa, and may also reach 3,500 MPa and even 4,000 MPa.

The wire diameter of the alloy wire rod may be 100-200 μm, and the tensile strength of the alloy wire rod may be 3,200-4,800 MPa. For example, the tensile strength is up to 3,400 MPa, and may also reach 4,000 MPa, or 4,500 MPa and even 4,800 MPa.

In some embodiments, the rare earth oxide is selected from one or more of dysprosium oxide, erbium oxide, neodymium oxide, yttrium oxide, europium oxide, gadolinium oxide, lanthanum oxide, praseodymium oxide, holmium oxide, cerium oxide, terbium oxide, ytterbium oxide, samarium oxide, praseodymium neodymium oxide, thulium oxide, lutetium oxide, scandium oxide and promethium oxide.

Specifically, for example, common rare earth oxides include dysprosium oxide $(Dy_2O_3)$, erbium oxide $(Er_2O_3)$, neodymium oxide $(Nd_2O_3)$, yttrium oxide (Y203), europium oxide $(Eu_2O_3)$, gadolinium oxide $(Gd_2O_3)$, lanthanum oxide $(La_2O_3)$, praseodymium oxide $(Pr_6O_{11})$, holmium oxide $(Ho_2O_3)$, cerium oxide $(CeO_2)$, terbium oxide $(Tb_4O_7)$, ytterbium oxide $(Yb_2O_3)$, samarium oxide $(Sm_2O_3)$, praseodymium neodymium oxide $((Pr+Nd)_xO_y)$, thulium oxide $(Tm_2O_3)$, lutetium oxide $(Lu_2O_3)$, scandium oxide $(Sc_2O_3)$, promethium oxide $(Pm_2O_3)$ and the like. However, during actual use, the rare earth oxide may only include one of lanthanum oxide ($La_2O_3$), yttrium oxide ($Y_2O_3$), cerium oxide ($CeO_2$), scandium oxide ($Sc_2O_3$) and other rare earth oxides, may also include lanthanum oxide ($La_2O_3$) and other rare earth oxides, such as scandium oxide ($Sc_2O_3$) and yttrium oxide ($Y_2O_3$) at the same time, or may include a combination of other rare earth oxides, such as lanthanum oxide ($La_2O_3$) and cerium oxide ($CeO_2$), lanthanum oxide ($La_2O_3$) and yttrium oxide ($Y_2O_3$), lanthanum oxide ($La_2O_3$) and scandium oxide ($Sc_2O_3$), cerium oxide ($CeO_2$) and yttrium oxide ($Y_2O_3$) and the like at the same time.

The rare earth oxide is mainly distributed at a grain boundary of a tungsten main phase (matrix phase), and is also distributed in grains of the matrix phase in a small amount. The rare earth oxide can be distributed in the form of lines or particle clusters.

When the wire diameter of the alloy wire rod made of the rare earth oxide and the tungsten is smaller, the tensile strength is higher. That is to say, by using the tungsten alloy wire rod made of the rare earth oxide and the tungsten, saw lines and cables having small wire diameter and high tensile strength can be obtained.

In addition, the rare earth oxide may also be a rare earth-metal composite oxide, such as YSZ and LSCO.

Moreover, the tungsten alloy may also contain a trace amount of carbides, other rare elements, metallic elements and non-metallic elements. For example, the carbides include TiC and ZrC, the other rare elements include Re and the like, the non-metallic elements include C and the like, and the metallic elements include potassium, rhenium, molybdenum, iron, cobalt and the like.

The content of potassium is less than 80 ppm. High-temperature properties of a material can be improved by adding an appropriate amount of K. However, when the content is too high, processing properties will be affected, resulting in cracks and broken wires.

In some embodiments, the content of the tungsten is 97.0-99.9 wt %, and the content of the rare earth oxide is 0.1-3.0 wt %.

For example, the content of the tungsten may also be greater than 95 wt %; and preferably, the content of the tungsten is 97.0-99.9 wt %, such as 97.5 wt %, 98 wt %, 98.5 wt %, 99 wt %, 99.5 wt % and the like.

For another example, the content of the rare earth oxide may be 0.1-3.0 wt %, also may be 0.1-2 wt %, 0.1-1 wt %, or 0.3-0.8 wt %, and certainly, also may be 0.1 wt %, 0.3 wt %, 0.5 wt %, 0.8 wt %, 1 wt %, 1.5 wt %, 2 wt % and the like. Properties of a metal wire can be improved by increasing the content of the rare earth oxide. However, when the content of the rare earth oxide is too high, the difficulty in refining the alloy wire rod will be greatly increased.

Further, the tungsten alloy further contains a metallic element, and the metallic element is selected from at least one of potassium, rhenium, molybdenum, iron, and cobalt.

In some embodiments, the content of potassium is less than 80 ppm.

In some embodiments, the tungsten alloy further contains carbon.

The present disclosure provides a preparation method of the alloy wire rod as mentioned above. The preparation method includes doped powder making, pressing, sintering, and cogging, where the cogging includes conducting cogging on a sintered billet by a multi-roll rolling way so that the ratio of the longitudinal length of particles of the rare earth oxide in a rolled tungsten rod along the wire rod to the particle size of the cross section of the particles is greater than 5.

In some embodiments, the doped powder making includes the following steps: solid-liquid doping, reduction, and powder making, where the solid-liquid doping includes conducting staged drying on a mixed tungsten-doped solution, the staged drying at least includes 2 temperature stages, and the 2 temperature stages are divided with 100° C. as a division line and include heat drying below 100° C. first and then heat drying above 100° C. For example, heat drying is conducted at 60-80° C. for 2-6 h first, and then heat drying is conducted at 110-150° C. for 3-5 h.

The staged heat drying is conducted by using a drying method including drying at low temperature first and then drying at high temperature. That is to say, drying is conducted below 100° C. first, so that rare earth salt particles are slowly precipitated and have a large number of nuclei formed. Then, drying is conducted at a temperature of greater than 100° C., so that a large number of rare earth salt particles have no time to merge and grow, and thereby, the particle size of the particles can be greatly reduced.

The staged drying at least includes 2 temperature stages, and the 2 temperature stages are divided with 100° C. as a division line and include heat drying below 100° C. first and then heat drying above 100° C.

In some embodiments, the staged drying in the solid-liquid doping includes a first drying stage and a second drying stage, the temperature of the first drying stage is 60-80° C., and the temperature of the second drying stage is 110-150° C.

It can be understood that in the two temperature stages with 100° C. as a division line, heat drying may be conducted in several temperature gradients or several temperature stages. For example, drying is conducted at 60° C. for 2 h first, followed by drying at 80° C. for 2 h, and then heating is conducted to reach 120° C. for drying. Certainly, the above examples have expressed only several embodiments of the present disclosure. Various adjustments and changes of the temperature stage can be made by persons of ordinary skill in the field without departing from the concept of the present disclosure, and all the adjustments and changes shall fall within the protection scope of the present disclosure.

In some embodiments, the reduction includes conducting reduction on a material obtained after the solid-liquid doping to obtain an alloy powder in a reduction furnace.

In some embodiments, the alloy powder has an average Fisher particle size of 1.0-4.0 μm.

In some embodiments, the doped powder making includes the following steps: liquid-liquid doping, reduction, and powder making, where the liquid-liquid doping includes: mixing a tungstic acid and/or tungstate solution with a soluble rare earth salt solution.

For example, an ammonium metatungstate solution and a rare earth salt solution are used as raw materials for liquid-liquid doping to obtain a blue tungsten powder doped with a rare earth salt.

In some embodiments, the doped powder making includes the following step: solid-solid doping, where the solid-solid doping includes: using a tungsten powder having a Fisher particle size of 1.0-4.0 μm and a rare earth oxide having a particle size distribution D90 of less than 2.0 μm as raw materials, and conducting mixing to obtain a tungsten powder doped with a rare earth oxide.

In some embodiments, in order to ensure the particle size of the rare earth oxide, the solid-solid doping further includes removing coarse particles by a water precipitation method to obtain fine particles of the rare earth oxide.

Based on the characteristics of fast precipitation of coarse particles and slow precipitation of fine particles, 3-level precipitation is conducted for 30-120 min to obtain a rare earth oxide having D90 of less than 2 μm.

In some embodiments, the D90 of fine particles of the rare earth oxide is less than 2 μm.

In some embodiments, the particle size of the rare earth oxide in the sintered billet is less than 2.5 μm.

In addition, the steps such as reduction and powder making, preferably include, but are not limited to, the following embodiments.

Reduction: A doped powder in a material prepared by doping in a solid-liquid and/or liquid-liquid way is subjected to primary reduction to obtain an alloy powder in a reduction furnace with four temperature zones.

Powder making: The alloy powder obtained after the reduction is mixed to obtain a new alloy powder having an average Fisher particle size of 1.0-4.0 μm, and the new alloy powder is placed in a powder mixing machine. Powder mixing is conducted at a rotation speed of 6-10 rpm for 60-90 min.

Powder pressing: The powder having an average Fisher particle size of 1.0-4.0 μm is pressed by an isostatic pressing method at a pressure of 160-260 MPa to obtain a press billet having a piece weight of 1.5-5.0 kg, and the press billet is presintered in an atmosphere of hydrogen, where the presintering is preferably conducted at a temperature of 1,200-1,400° C. to improve the strength of the press billet.

Sintering: Sintering is conducted, where the sintering is preferably conducted at a temperature of 1,800-2,400° C. for 5-15 h to obtain a sintered billet having a density of 17.5-18.5 g/cm³.

Cogging: The sintered billet having a diameter of 15-25 mm is continuously rolled for cogging by a multi-roll mill at a heating temperature of 1,600-1,700° C. to obtain an alloy rod having a diameter of 8.0-12.0 mm.

By means of the multi-roll mill, it is ensured that the ratio of the longitudinal length of particles of the rare earth oxide in a rolled tungsten rod along the wire rod to the particle size of the cross section of the particles is greater than 5.

Pressure processing: After rolling by the multi-roll mill, multi-pass rotary forging is adopted, then drawing processing is conducted by using different specifications of wire drawing dies, and drawing is repeated for several times to obtain alloy wire rods having different specifications and diameters.

Next, the alloy wire rods prepared can be subjected to a low-temperature stress removal annealing process within 1,000° C., so as to homogenize the stress distribution and improve the straightness. The process can be carried out in a heating furnace or other devices. Specifically, the alloy wire rods can also be subjected to low-temperature stress removal annealing under the protection of hydrogen.

Moreover, the wire rods after drawing can be subjected to electrolytic polishing and cleaning, so as to make the surfaces of the wire rods smooth. According to an electrolytic polishing process, for example, the alloy wire rods and a counter electrode such as a carbon rod are impregnated in an electrolyte and then electrified.

The present disclosure provides application of an alloy wire rod in the field of cutting of materials, where the alloy wire rod as mentioned above or an alloy wire rod prepared by the preparation method of the alloy wire rod as mentioned above is used as the alloy wire rod.

In some embodiments, the materials at least include hard surface materials; the hard surface materials at least include silicon wafers, magnetic materials, and semiconductor materials; and the semiconductor materials at least include sapphire and silicon carbide.

The present disclosure provides application of an alloy wire rod to cables/ropes, where the alloy wire rod as mentioned above or an alloy wire rod prepared by the preparation method of the alloy wire rod as mentioned above is used as the alloy wire rod.

In some embodiments, the cables/ropes are used for traction of medical/industrial precision instruments and high-temperature furnaces.

The present disclosure provides application of an alloy wire rod in the field of textiles, where the alloy wire rod as mentioned above or an alloy wire rod prepared by the preparation method of the alloy wire rod as mentioned above is used as the alloy wire rod.

In some embodiments, the application includes spinning or weaving the alloy wire rod into a glove or a protective suit.

Technical solutions of the present disclosure are clearly and completely described below in combination with some embodiments of the present disclosure. Obviously, the embodiments described are merely a part, rather than all of the embodiments of the present disclosure. Based on the embodiments of the present disclosure, all other embodiments obtained by persons of ordinary skill in the field without any creative effort shall fall within the protection scope of the present disclosure.

As an embodiment of the present disclosure, an alloy wire rod is provided. The alloy wire rod is made of a tungsten alloy, and the tungsten alloy contains tungsten and an oxide of lanthanum, where the content of the tungsten is greater than 90 wt %, and the content of the oxide of lanthanum is greater than 0.1 wt % and less than 2.0 wt %.

For example, the content of the tungsten may also be greater than 95 wt %; and preferably, the content of the tungsten is 97.0-99.9 wt %, such as 97.5 wt %, 98 wt %, 98.5 wt %, 99 wt %, 99.5 wt % and the like.

For another example, the content of the oxide of lanthanum may be 0.1-2 wt %, also may be 0.1-1 wt %, or 0.3-0.8 wt %, and certainly, also may be 0.1 wt %, 0.3 wt %, 0.5 wt %, 0.8 wt %, 1 wt %, 1.5 wt %, 2 wt % and the like. The oxide of lanthanum is preferably lanthanum oxide ($La_2O_3$). Properties of the alloy wire rod can be improved by increasing the content of the oxide of lanthanum. However, when the content of the oxide of lanthanum is greater than 2 wt %, the difficulty in refining the alloy wire rod will be greatly increased.

In the alloy wire rod, the oxide of lanthanum is mainly distributed at a grain boundary of a tungsten main phase (matrix phase), and is also distributed in grains of the matrix phase in a small amount. The oxide of lanthanum can be distributed in the form of lines or particle clusters.

When the wire diameter of the alloy wire rod made of the oxide of lanthanum and the tungsten is smaller, the tensile strength is higher. That is to say, by using the tungsten alloy wire rod made of the oxide of lanthanum and the tungsten, saw lines and cables having small wire diameter and high tensile strength can be obtained.

In addition, the oxide of lanthanum may also be a lanthanum-metal composite oxide, such as LSCO.

Moreover, the tungsten alloy may also contain a trace amount of carbides, other rare elements, metallic elements and non-metallic elements. For example, the carbides include TiC and ZrC, the other rare elements include rhenium and the like, the non-metallic elements include C and the like, and the metallic elements include potassium, molybdenum, iron, cobalt and the like.

The content of potassium is less than 80 ppm. High-temperature properties of a material can be improved by adding an appropriate amount of potassium. However, when the content is too high, processing properties will be affected, resulting in cracks and broken wires.

As another embodiment of the present disclosure, an alloy wire rod is provided. The alloy wire rod is made of a tungsten alloy, and the tungsten alloy contains tungsten and an oxide of cerium, where the content of the tungsten is greater than 90 wt %, and the content of the oxide of cerium is greater than 0.1 wt % and less than 1.5 wt %.

For example, the content of the tungsten may also be greater than 95 wt %; and preferably, the content of the tungsten is 97.0-99.9 wt %, such as 97.5 wt %, 98 wt %, 98.5 wt %, 99 wt %, 99.5 wt % and the like.

For another example, the content of the oxide of cerium may be 0.2-1.5 wt %, also may be 0.2-1 wt %, or 0.3-0.8 wt %, and certainly, also may be 0.2 wt %, 0.3 wt %, 0.5 wt %, 0.8 wt %, 1 wt %, 1.5 wt % and the like. The oxide of cerium is preferably cerium oxide ($CeO_2$) Properties of the alloy wire rod can be improved by increasing the content of the oxide of cerium. However, when the content of the oxide of cerium is greater than 1.5 wt %, the difficulty in refining the alloy wire rod will be greatly increased.

As another embodiment of the present disclosure, an alloy wire rod is provided. The alloy wire rod is made of a tungsten alloy, and the tungsten alloy contains tungsten and an oxide of yttrium, where the content of the tungsten is greater than 90 wt %, and the content of the oxide of yttrium is greater than 0.1 wt % and less than 1.5 wt %.

For example, the content of the tungsten may also be greater than 95 wt %; and preferably, the content of the tungsten is 97.0-99.9 wt %, such as 97.5 wt %, 98 wt %, 98.5 wt %, 99 wt %, 99.5 wt % and the like.

For another example, the content of the oxide of yttrium may be 0.2-1.5 wt %, also may be 0.2-1 wt %, or 0.3-0.8 wt %, and certainly, also may be 0.2 wt %, 0.3 wt %, 0.5 wt %, 0.8 wt %, 1 wt %, 1.5 wt % and the like. The oxide of yttrium is preferably yttrium oxide ($Y_2O_3$). Properties of the alloy wire rod can be improved by increasing the content of the oxide of yttrium. However, when the content of the oxide of yttrium is greater than 1.5 wt %, the difficulty in refining the alloy wire rod will be greatly increased.

The tensile strength of the alloy wire rod is greater than 3,800 MPa, and may also be greater than 4,200 MPa, or even greater than 4,800 MPa or 5,000 MPa.

In addition, the alloy wire rod has an elastic ultimate strength of greater than 2,500 MPa. For example, the elastic ultimate strength of the alloy wire rod may also be greater than 2,700 MPa, greater than 3,000 MPa, or even greater than 3,200 MPa.

The alloy wire rod has a wire diameter of less than 100 μm. For example, the wire diameter of the alloy wire rod is 100 μm, or 80 μm, and is even 60 μm, 40 μm, 25 μm, 20 μm, and 10 μm. The alloy wire rod may be uniform or incomplete uniform, and may also include differences of several percents, such as 1%, according to parts.

In particular, the wire diameter of the alloy wire rod may be equal to or less than 60 μm, so that the alloy wire rod has softness and can be easily bent thoroughly, and accordingly, the alloy wire rod can be easily wound.

Thus, the diameter of a push-pull core wire of the alloy wire rod may be less than 350 μm. For example, the diameter may be 230 μm, 200 μm, 180 μm, 160 μm, 130 μm and the like, indicating that the alloy wire rod also has excellent push-pull toughness.

Specifically, for example, the wire diameter of the alloy wire rod is equal to or less than 100 μm; and the tensile strength of the alloy wire rod is greater than 3,800 MPa.

The wire diameter of the alloy wire rod is equal to or less than 60 μm; the tensile strength of the alloy wire rod is greater than 4,200 MPa; the elastic ultimate strength of the alloy wire rod is greater than 2,500 MPa; and the diameter of a push-pull core wire of the alloy wire rod is less than 350 μm, or even less than 180 μm.

The wire diameter of the alloy wire rod is equal to or less than 40 μm; the tensile strength of the alloy wire rod is greater than 4,800 MPa; the elastic ultimate strength of the alloy wire rod is greater than 2,700 MPa; and the diameter of a push-pull core wire of the alloy wire rod is less than 350 μm, or even less than 200 μm.

The wire diameter of the alloy wire rod is equal to or less than 25 μm; the tensile strength of the alloy wire rod is greater than 5,000 MPa; the elastic ultimate strength of the alloy wire rod is greater than 3,000 MPa; and the diameter of a push-pull core wire of the alloy wire rod is less than 350 μm, or even less than 250 μm.

The present disclosure provides a preparation method of an alloy wire rod.

The preparation method includes the steps of doped powder making, pressing, sintering, cogging, and pressure processing, and the doped powder making includes doping, reduction, and powder making, where the doped powder making is divided to include a solid-liquid way, a liquid-liquid way, and a solid-solid way according to different processes.

Specifically, based on the solid-liquid way, the doped powder making includes the following steps:

solid-liquid doping, reduction, and powder making

A solid-liquid doping method includes: doping an appropriate amount of a soluble lanthanum salt solution into a tungsten powder, conducting thorough stirring, and then conducting staged heat drying.

The staged heat drying is conducted by using a drying method including drying at low temperature first and then drying at high temperature. That is to say, drying is conducted below 100° C. first, so that lanthanum salt particles are slowly precipitated and have a large number of nuclei formed. Then, drying is conducted at a temperature of greater than 100° C., so that a large number of lanthanum salt particles have no time to merge and grow, and thereby, the particle size of the particles can be greatly reduced.

The staged drying at least includes 2 temperature stages, and the 2 temperature stages are divided with 100° C. as a division line and include heat drying below 100° C. first and then heat drying above 100° C. For example, heat drying is conducted at 60-80° C. for 2-6 h first, and then heat drying is conducted at 110-150° C. for 3-5 h.

It can be understood that in the two temperature stages with 100° C. as a division line, heat drying may be conducted in several temperature gradients or several temperature stages. For example, drying is conducted at 60° C. for 2 h first, followed by drying at 80° C. for 2 h, and then heating is conducted to reach 120° C. for drying. Certainly, the above examples have expressed only several embodiments of the present disclosure. Various adjustments and changes of the temperature stage can be made by persons of ordinary skill in the field without departing from the concept of the present disclosure, and all the adjustments and changes shall fall within the protection scope of the present disclosure.

For another example, an appropriate amount of a lanthanum nitrate solution is uniformly doped into a blue tungsten powder, thorough stirring is conducted, and then heating is conducted at 60-80° C. for 2-6 h first, followed by heating at 110-150° C. for 3-5 h.

Specifically, based on the liquid-liquid way, the doped powder making includes the following steps:

liquid-liquid doping, reduction, and powder making.

A liquid-liquid doping method includes: doping a tungstic acid and/or tungstate solution into a soluble lanthanum salt solution to obtain a tungsten powder doped with a lanthanum salt.

For example, an ammonium metatungstate solution and a lanthanum salt solution are used as raw materials for liquid-liquid doping to obtain a blue tungsten powder doped with a lanthanum salt.

Specifically, based on the solid-solid way, the doped powder making includes the following step: solid-solid doping.

A solid-solid doping method includes: using a tungsten powder having a Fisher particle size of 1.0-4.0 μm and an oxide of lanthanum having a particle size distribution D90 of less than 2.0 μm as raw materials, and conducting solid-solid doping for mixing to obtain a tungsten powder doped with an oxide of lanthanum.

Further, in order to ensure the particle size of the oxide of lanthanum the step of solid-solid doping further includes removing coarse particles by a water precipitation method to obtain fine particles of the oxide of lanthanum.

Based on the characteristics of fast precipitation of coarse particles and slow precipitation of fine particles, 3-level precipitation is conducted for 30-120 min to obtain an oxide of lanthanum having D90 of less than 2 μm.

In addition, the steps such as reduction and powder making, preferably include, but are not limited to, the following embodiments.

Reduction: A doped powder in a material prepared by doping in a solid-liquid and/or liquid-liquid way is subjected to primary reduction to obtain an alloy powder in a reduction furnace with four temperature zones.

Powder making: The alloy powder obtained after the reduction is mixed to obtain a new alloy powder having an average Fisher particle size of 1.0-4.0 μm, and the new alloy powder is placed in a powder mixing machine. Powder mixing is conducted at a rotation speed of 6-10 rpm for 60-90 min.

Powder pressing: The powder having an average Fisher particle size of 1.0-4.0 μm is pressed by an isostatic pressing method at a pressure of 160-260 MPa to obtain a press billet having a piece weight of 1.5-5.0 kg, and the press billet is presintered in an atmosphere of hydrogen, where the presintering is preferably conducted at a temperature of 1,200-1,400° C. to improve the strength of the press billet.

Sintering: Sintering is conducted, where the sintering is preferably conducted at a temperature of 1,800-2,400° C. for 5-15 h to obtain a sintered billet having a density of 17.5-18.5 g/cm³.

Cogging: The sintered billet having a diameter of 15-25 mm is continuously rolled for cogging by a multi-roll mill at a heating temperature of 1,600-1,700° C. to obtain an alloy rod having a diameter of 8.0-12.0 mm.

By means of the multi-roll mill, it is ensured that the ratio of the longitudinal length of particles of the oxide of lanthanum in a rolled tungsten rod along the wire rod to the particle size of the cross section of the particles is greater than 5.

Pressure processing: After rolling by the multi-roll mill, multi-pass rotary forging is adopted, then drawing processing is conducted by using different specifications of wire drawing dies, and drawing is repeated for several times to obtain alloy wire rods having different specifications and diameters.

Next, the alloy wire rods prepared can be subjected to a low-temperature stress removal annealing process within 1,000° C., so as to homogenize the stress distribution and improve the straightness. The process can be carried out in a heating furnace or other devices. Specifically, the alloy wire rods can also be subjected to low-temperature stress removal annealing under the protection of hydrogen.

Moreover, the wire rods after drawing can be subjected to electrolytic polishing and cleaning, so as to make the surfaces of the wire rods smooth. According to an electrolytic polishing process, for example, the alloy wire rods and a counter electrode such as a carbon rod are impregnated in an electrolyte and then electrified.

Compared with conventional tungsten alloy wire rods, the present disclosure has the following characteristics and advantages.

First, when solid-liquid doping is used in a doping process of the present disclosure, drying is conducted by using a staged drying mode including drying at low temperature (below 100° C.) first and then drying at high temperature (above 100° C.). At first, lanthanum nitrate particles are slowly precipitated and have a large number of nuclei formed. Then, a large number of lanthanum nitrate particles have no time to merge and grow. According to this drying method, the particle size of the particles can be greatly reduced. By adjusting the drying temperature during doping, the nucleation and crystallization rates of a lanthanum nitrate are controlled, so that lanthanum nitrate crystals on the doped blue tungsten particles are finer.

During solid-solid doping, coarse particles are removed by a water precipitation method. Meanwhile, based on the characteristics of fast precipitation of coarse particles and slow precipitation of fine particles, 3-level precipitation is conducted for 30-120 min to obtain an oxide of lanthanum having D90 of less than 2 μm.

Therefore, in the present disclosure, the particle size of the oxide of lanthanum on the surface of the tungsten powder particles produced and the particle size of the oxide of lanthanum of the sintered billet are smaller than that in a traditional method. The oxide of lanthanum has a particle size of less than 2.5 um, and is more uniformly distributed. Properties of a product are more stable.

Second, in the present disclosure, cogging is conducted on the sintered billet by a multi-roll rolling method. Through deep deformation processing of an alloy material in a large deformation quantity at a speed of greater than 2.5 m/s and rotary forging of traditional tungsten rods and tungsten wires for cogging, dispersion particles of lanthanum are fractured in the cogging process due to violent radial processing in rotary forging, so that the dispersion particles form voids in gaps of a tungsten matrix. According to this processing method, stress concentration of the material and generation of defects will be caused subsequently, leading to difficulties in subsequent processing. A multi-roll (three-roll/four-roll)

mill is used herein. In this case, a fiber structure of a matrix of an alloy material is more developed during cogging, the longitudinal deformation rate is higher, dispersion particles of the oxide of lanthanum are driven to undergo larger thinning deformation, the particle size of the cross section of the particles becomes smaller, and the axial size becomes higher, so as to ensure that the tungsten matrix and the dispersion particles have good plasticity and toughness after cogging. The dispersion particles can further form a fiber strengthened structure in subsequent continuous forging, so that the strength and toughness of tungsten wires are improved.

Therefore, the present disclosure provides the following examples and comparative examples.

EXAMPLE 1.1

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 1.2

In this example, a tungsten alloy wire rod having high strength and toughness is prepared according to the present disclosure. The material includes the following element components: 0.15 wt % of $La_2O_3$ and 99.85 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 1.3

In this example, a tungsten alloy wire rod having high strength and toughness is prepared according to the present disclosure. The material includes the following element components: 1.5 wt % of $La_2O_3$ and 98.5 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 1.4

In this example, a tungsten alloy wire rod having high strength and toughness is prepared according to the present disclosure. The material includes the following element components: 1.8 wt % of La₂O₃ and 98.2 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 1.5

In this example, a tungsten alloy wire rod having high strength and toughness is prepared according to the present disclosure. The material includes the following element components: 1 wt % of La₂O₃, 50 ppm of K, and the balance of W.

The tungsten alloy wire rod is prepared in the following steps:

step 1: doping: uniformly doping an appropriate amount of a lanthanum nitrate solution into a potassium-doped tungsten powder with a potassium content of 50 ppm, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 1.6

In this example, a tungsten alloy wire rod having high strength and toughness is prepared according to the present disclosure. The material includes the following element components: 1 wt % of La₂O₃, 0.2 wt % of Y₂O₃, and 98.8 wt % of W.

The tungsten alloy wire rod is prepared in the following steps:

step 1: doping uniformly doping appropriate amounts of a lanthanum nitrate solution and a yttrium nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 1.1

In this comparative example, a tungsten alloy wire rod is produced by a conventional process. The material includes the following element components same as that in Example 1: 1 wt % of $La_2O_3$ and 99 wt % of W.

The tungsten wire is prepared in the following steps:

step 1: doping: uniformly doping an appropriate amount of a lanthanum nitrate solution into a blue tungsten powder, conducting thorough stirring, and then conducting steam drying at a temperature of 120° C. for 4 h;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: conducting multi-pass rotary forging on the sintered billet having a diameter of 23 mm for cogging to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 1.2

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting steam drying at a temperature of 120° C. for 4 h;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 1.3

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: conducting multi-pass rotary forging on the sintered billet having a diameter of 23 mm for cogging to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 1.4

In this example, a tungsten alloy wire rod having high strength and toughness is prepared according to the present disclosure. The material includes the following element components: 0.07 wt % of $La_2O_3$ and 99.93 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 1.5

In this example, a tungsten alloy wire rod having high strength and toughness is prepared according to the present disclosure. The material includes the following element components: 2.2 wt % of $La_2O_3$ and 97.8 wt % of W.

The tungsten alloy wire rod is prepared in the following steps:

step 1: doping: uniformly doping an appropriate amount of a lanthanum nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 g/cm³;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 2.1

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: solid-solid doping: adding a lanthanum oxide powder to a water solution, conducting stirring for 5 min, and pouring an upper solution into a two-level water tank, followed by stirring for 5 min; after placement for precipitation for 10 min, pouring an upper solution into a three-level water tank, followed by stirring for 5 min; after placement for precipitation for 30 min, pouring an upper solution into a four-level water tank, followed by precipitation for 24 h; filtering the solution, and heating for drying at 100° C. for 24 h to obtain a lanthanum oxide powder having D90 of less than 2.0 μm; and conducting homogeneous mixing on a tungsten powder having an average particle size of 2.0 μm and an appropriate amount of the lanthanum oxide powder having D90 of less than 2.0 μm after water precipitation treatment by a powder mixing device for 60 min;

step 2: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 3: high-temperature sintering: conducting high-temperature sintering to obtain a sintered billet having a density of 18.10 $g/cm^3$;

step 4: cogging: continuously rolling the sintered billet having a diameter of 23.0 mm for cogging by a multi-roll mill at a heating temperature of 1,650° C. to obtain an alloy rod having a diameter of 8.0 mm; and step 5: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 2.1

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: solid-solid doping: conducting homogeneous mixing on a tungsten powder having an average particle size of 2.0 μm and an appropriate amount of a lanthanum oxide powder by a powder mixing device for 60 min;

step 2: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 3: high-temperature sintering: conducting high-temperature sintering to obtain a sintered billet having a density of 18.10 $g/cm^3$;

step 4: cogging: conducting multi-pass rotary forging on the sintered billet having a diameter of 23.0 mm for cogging to obtain an alloy rod having a diameter of 8.0 mm; and step 5: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 2.2

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: solid-solid doping: conducting homogeneous mixing on a tungsten powder having an average particle size of 2.0 μm and an appropriate amount of a lanthanum oxide powder by a powder mixing device for 60 min;

step 2: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 3: high-temperature sintering: conducting high-temperature sintering to obtain a sintered billet having a density of 18.10 $g/cm^3$;

step 4: cogging: continuously rolling the sintered billet having a diameter of 23.0 mm for cogging by a multi-roll mill at a heating temperature of 1,650° C. to obtain an alloy rod having a diameter of 8.0 mm; and step 5: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 2.3

In this example, a tungsten alloy wire rod having high strength and toughness is prepared according to the present disclosure. The material includes the following element components: 1 wt % of $La_2O_3$ and 99 wt % of W.

The tungsten alloy wire rod is prepared in the following steps:

step 1: solid-solid doping: adding an appropriate amount of a lanthanum oxide powder to a water solution, conducting stirring for 5 min, and pouring an upper solution into a two-level water tank, followed by stirring for 5 min; after placement for precipitation for 10 min, pouring an upper solution into a three-level water tank, followed by stirring for 5 min; after placement for precipitation for 30 min, pouring an upper solution into a four-level water tank, followed by precipitation for 24 h; filtering the solution, and heating for drying at 100° C. for 24 h to obtain a lanthanum oxide powder having D90 of less than 2.0 μm; and conducting homogeneous mixing on a tungsten powder having an average particle size of 2.0 μm and an appropriate amount of the lanthanum oxide powder having D90 of less than 2.0 μm after water precipitation treatment by a powder mixing device for 60 min;

step 2: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 3: high-temperature sintering: conducting high-temperature sintering to obtain a sintered billet having a density of 18.10 $g/cm^3$;

step 4: cogging: conducting multi-pass rotary forging on the sintered billet having a diameter of 23 mm for cogging to obtain an alloy rod having a diameter of 8.0 mm; and step 5: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 3

In this example, a tungsten alloy wire rod having high strength and toughness is prepared according to the present disclosure. The material includes the following element components: 1 wt % of $CeO_2$ and 99 wt % of W.

The tungsten alloy wire rod is prepared in the following steps:

step 1: doping: uniformly doping an appropriate amount of a cerium nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

EXAMPLE 4

In this example, a tungsten alloy wire rod having high strength and toughness is prepared according to the present disclosure. The material includes the following element components: 1 wt % of $Y_2O_3$ and 99 wt % of W.

The tungsten alloy wire rod is prepared in the following steps:

step 1: doping: uniformly doping an appropriate amount of a yttrium nitrate solution into a blue tungsten powder, conducting thorough stirring, and then conducting drying in a mode including drying at 80° C. for 4 h first and then drying at a high temperature of 120° C.;

step 2: reduction: subjecting a doped powder in a material prepared in step 1 to primary reduction to obtain alloy powders having suitable particle sizes in a reduction furnace with four temperature zones;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders having different particle sizes by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering to obtain a sintered billet having a density of 18.10 $g/cm^3$;

step 6: cogging: continuously rolling the sintered billet having a diameter of 23.0 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 3

In this comparative example, a rhenium-tungsten alloy wire rod is prepared. The material includes the following element components: 1 wt % of Re and 99 wt % of W. The rhenium-tungsten alloy wire rod is prepared in the following steps:

step 1: doping: weighing a tungsten powder and ammonium rhenate according to the weight percents, adding an appropriate amount of deionized water and the weighed ammonium rhenate to a doping pot for thorough dissolution, then adding the weighed tungsten powder, conducting stirring by solid-liquid mixing, and finally conducting drying at a temperature of 120° C. for 4 h;

step 2: reduction: subjecting a material prepared in step 1 to primary reduction to obtain rhenium-tungsten alloy powders in a reduction furnace with four temperature zones, where the rhenium-tungsten alloy powders include 1.000 wt % of rhenium as the key component;

step 3: powder mixing: placing materials obtained in step 2 in a powder mixing machine according to different particle sizes and compositions, and conducting powder mixing at a rotation speed of 8 rpm for 80 min;

step 4: powder pressing: pressing powders obtained in step 3 by an isostatic pressing method at a pressure of 200 MPa to obtain a press billet having a piece weight of 3.0 kg, and subjecting the press billet to presintering at low temperature in an atmosphere of hydrogen to improve the strength of the press billet;

step 5: high-temperature sintering: conducting high-temperature sintering on a presintered billet obtained in step 4 to obtain a sintered billet having a density of 18.2 $g/cm^3$;

step 6: cogging: continuously rolling the sintered billet having a diameter of 23 mm for cogging by a multi-roll mill at a heating temperature of 1,650° C. to obtain an alloy rod having a diameter of 8.0 mm; and step 7: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

Comparative Example 4

In this comparative example, a conventional pure tungsten wire is prepared.

The tungsten wire is prepared in the following steps:

step 1: reduction: placing ammonium paratungstate in a reduction furnace with four temperature zones, conducting reduction to obtain a blue tungsten oxide powder, and then conducting secondary reduction to obtain a pure tungsten powder;

step 2: powder mixing: placing materials obtained in step 1 in a powder mixing machine according to different particle sizes and compositions, and conducting powder mixing at a rotation speed of 8 rpm for 80 min;

step 3: powder pressing: pressing powders obtained in step 2 by an isostatic pressing method at a pressure of 160 MPa to obtain a press billet having a piece weight of 3.0 kg and a diameter of 20 mm, and subjecting the press billet to presintering at low temperature in an atmosphere of hydrogen to improve the strength of the press billet;

step 4: high-temperature sintering: conducting high-temperature sintering on a presintered billet obtained in step 3 to obtain a sintered billet having a density of 17.6 g/cm³ and a diameter of 17.5 mm;

step 5: cogging: continuously rolling the sintered billet having a diameter of 17.5 mm for cogging by a multi-roll mill at a heating temperature of 1,600° C. to obtain an alloy rod having a diameter of 8.0 mm; and step 6: pressure processing: conducting multi-pass rotary forging, then conducting drawing processing by using different specifications of wire drawing dies, and repeating drawing for several times to obtain alloy wire rods having different specifications and diameters.

In addition, tungsten wires were subjected to annealing treatment to eliminate residual stress caused by plastic deformation, so as to conduct the multi-pass drawing processing smoothly.

It should be noted that specific parameters or some commonly used reagents in the above embodiments are used in specific embodiments or preferred embodiments under the concept of the present disclosure, and are not intended to limit the present disclosure. Adaptive adjustments can be made by persons skilled in the field within the concept and protection scope of the present disclosure.

According to the tungsten powders and sintered billets obtained in Examples 1.1 and 2.1 and Comparative Examples 1.1 and 2.1, the particle size of $La_2O_3$ particles on the surfaces of the tungsten powders and the sintered billets was measured by an electron microscope and then evaluated. Test results are as shown in Table 1.

TABLE 1

Particle size of $La_2O_3$ particles on tungsten powders and billets in examples and comparative examples

|  | Powder | Billet |
|---|---|---|
| Example 1.1 | 70-150 nm | 300-1800 nm |
| Comparative Example 1.1 | 100-500 nm | 1000-5000 nm |
| Example 2.1 | 200-2000 nm | 400-2500 nm |
| Comparative Example 2.1 | 200-5000 nm | 800-6000 nm |

According to the test results in Table 1, it can be seen that the particle size of the $La_2O_3$ particles in an alloy tungsten material can be effectively reduced by the processing technology provided by the present disclosure.

According to different specifications of products, including billets, bars having a diameter of 8.0 mm, 5.0 mm, 1.0 mm and 0.4 mm and wire rods obtained in Example 1.1, Comparative Examples 1.1-1.3 and Comparative Examples 2.1-2.3, the particle size of $La_2O_3$ particles was measured by an electron microscope and then evaluated. Test results are as shown in Table 2.

TABLE 2

Particle size of $La_2O_3$ particles on different specifications of products in examples and comparative examples

| Specification of wires (mm) | Particle size of $La_2O_3$ (nm) | | | | | Particle size ratio of an oxide |
|---|---|---|---|---|---|---|
|  | Billet | 8.0 | 5.0 | 1.0 | 0.4 |  |
| Example 1.1 | 300-1800 | 130-780 | 60-340 | 25-140 | 9-55 | 5-20 |
| Comparative Example 1.1 | 1500-5000 | 1100-3000 | 770-1700 | 370-900 | 210-490 | 3-8 |
| Comparative Example 1.2 | 1500-5000 | 600-1900 | 370-930 | 150-520 | 70-300 | 5-20 |
| Comparative Example 1.3 | 300-1800 | 220-1200 | 160-750 | 95-490 | 58-290 | 3-8 |
| Example 2.1 | 400-2500 | 190-1200 | 90-580 | 35-220 | 10-80 | 5-20 |
| Comparative Example 2.1 | 800-6000 | 610-4500 | 390-2900 | 210-1500 | 140-910 | 3-8 |
| Comparative Example 2.2 | 800-6000 | 320-3000 | 180-1650 | 95-780 | 50-410 | 5-20 |
| Comparative Example 2.3 | 400-2500 | 280-1500 | 200-950 | 110-560 | 70-350 | 3-8 |

According to the test results in Table 2, it can be seen that the particle size of oxide particles on the surfaces of the alloy billets and wire rods produced by the processing technology provided by the present disclosure is much smaller than that of the alloy bars and wire rods produced by the process used in Comparative Examples 1.1-1.3 and Comparative Examples 2.1-2.3.

According to different specifications of wire rods, including a 0.1 mm wire rod, a 0.06 mm wire rod, a 0.04 mm wire rod and a 0.025 mm wire rod obtained in examples and comparative examples, the tensile strength, elastic ultimate strength and push-pull toughness of the wire rods were tested by the following methods.

A tensile strength testing method: A standard tensile machine was used, a tungsten wire having a length of 200 mm was clamped, and one end of the tungsten wire was loaded at a constant speed to obtain tensile strength data and elastic ultimate strength.

The tensile strength can be calculated by the following formula (1):

$$\sigma=F/S \qquad (1)$$

where F refers to tensile force, N; and S refers to original cross-sectional area, mm A push-pull toughness testing method: A tungsten wire was wrapped around a straightening core wire for a circle, then a reverse force was applied by a sample disk (greater than 8 g), and a wire receiving disk was controlled by a motor for wire receiving at high speed. During motion of the tungsten wire wrapped around the core wire, when the diameter of the core wire is smaller, the tungsten wire passes at high speed without wire breaking, indicating that the toughness is better. Preferably, 50 g of a reverse force is applied to a 100 μm tungsten wire; 12 g of a reverse force is applied to a 40 μm tungsten wire; and 8 g of a reverse force is applied to a 25 μm tungsten wire. A push-pull testing device is as shown in FIG. 1, and test and evaluation results are as shown in Table 3.

TABLE 3

Test table of properties in solid-liquid doping
examples and comparative examples in prior art

| Sample | Specification μm | Tensile strength Mpa | Elastic ultimate strength Mpa | Minimum diameter of a bearable push-pull core wire μm |
|---|---|---|---|---|
| Example 1.1 | 200 | 3200 | / | / |
| | 100 | 3950 | / | / |
| | 60 | 4480 | 3005 | 290 |
| | 40 | 4994 | 3185 | 250 |
| | 25 | 5327 | 3250 | 220 |
| Example 1.2 | 100 | 3810 | / | / |
| | 60 | 4210 | 2575 | 120 |
| | 40 | 4816 | 2730 | 90 |
| | 25 | 5008 | 3032 | 70 |
| Example 1.3 | 100 | 4138 | / | / |
| | 60 | 4568 | 3345 | 320 |
| | 40 | 5280 | 3551 | 300 |
| | 25 | 5681 | 3797 | 290 |
| Example 1.4 | 100 | 4746 | / | / |
| | 60 | 5284 | 3567 | 350 |
| | 40 | 5770 | 4667 | 330 |
| | 25 | 6485 | 4881 | 320 |
| Example 1.5 | 100 | 4075 | / | / |
| | 60 | 4550 | 3169 | 310 |
| | 40 | 5100 | 3350 | 280 |
| | 25 | 5440 | 3640 | 240 |

TABLE 3-continued

Test table of properties in solid-liquid doping
examples and comparative examples in prior art

| Sample | Specification μm | Tensile strength Mpa | Elastic ultimate strength Mpa | Minimum diameter of a bearable push-pull core wire μm |
|---|---|---|---|---|
| Example 1.6 | 100 | 4170 | / | / |
| | 60 | 4580 | 3288 | 340 |
| | 40 | 5190 | 3440 | 330 |
| | 25 | 5480 | 3650 | 310 |
| Example 3 | 100 | 4000 | / | / |
| | 60 | 4500 | 2990 | 300 |
| | 40 | 5000 | 3160 | 250 |
| | 25 | 5325 | 3340 | 230 |
| Example 4 | 100 | 4050 | / | / |
| | 60 | 4570 | 2995 | 290 |
| | 40 | 5100 | 3175 | 250 |
| | 25 | 5425 | 3240 | 220 |
| Comparative Example 3 | 100 | 4100 | / | / |
| | 60 | 4460 | 2830 | 600 |
| | 40 | 4933 | 3001 | 550 |
| | 25 | 5000 | 3039 | 520 |
| Comparative Example 4 | 100 | 2680 | / | / |
| | 60 | 3150 | 2260 | 120 |
| | 40 | 3440 | 2378 | 80 |
| | 25 | 3680 | 2400 | 60 |

It should be noted that in Table 3, "/" indicates that no relevant test has been conducted.

According to the test results in Table 3, it can be seen that the tensile strength and elastic ultimate strength of various specifications of wire rods produced by the present disclosure are much higher than that of tungsten wire rods produced by the conventional process and are higher than that of rhenium-tungsten alloy wire rods. Based on the same push-pull toughness, the comprehensive performance of the tungsten wire rods prepared by the processing technology provided by the present disclosure in tensile strength and push-pull toughness is much better than that of the rhenium-tungsten alloy wire rods and the tungsten wire rods produced by the conventional process.

The tensile strength of the tungsten alloy wire rod prepared in Comparative Example 3 can reach greater than 4,500 MPa, but the push-pull performance is very poor, indicating that the toughness of the wire rod is far lower than that of the wire rod in the present disclosure. Therefore, according to the alloy wire rod prepared by the processing technology provided by the present disclosure, due to the addition of substances such as oxide of lanthanum and the process, mass production of alloy wire rods having lower specifications, higher strength and better toughness can be realized.

TABLE 4

Test table of properties in solid-liquid doping
Example 1.1 and Comparative Examples 1.1-1.5

| Sample | Specification/μm | Tensile strength/Mpa |
|---|---|---|
| Example 1.1 | 200 | 3200 |
| | 100 | 3950 |
| | 60 | 4480 |
| | 40 | 4994 |
| | 25 | 5327 |
| Comparative Example 1.1 | 200 | 2900 |
| | 100 | \ |
| | 60 | \ |

TABLE 4-continued

Test table of properties in solid-liquid doping
Example 1.1 and Comparative Examples 1.1-1.5

| Sample | Specification/μm | Tensile strength/Mpa |
|---|---|---|
| Comparative Example 1.2 | 200 | 2950 |
| | 100 | 3380 |
| | 60 | \ |
| Comparative Example 1.3 | 200 | 2960 |
| | 100 | 3300 |
| | 60 | \ |
| Comparative Example 1.4 | 200 | 2580 |
| | 100 | 2810 |
| | 60 | 3350 |
| Comparative Example 1.5 | 200 | 4120 |
| | 100 | \ |
| | 60 | \ |

It should be noted that in Table 4, "\" indicates that the specification of a wire rod cannot be further reduced by processing.

According to the test results in Table 4, it can be seen that by using solid-liquid doping and a cogging method of multi-roll rolling provided by the present disclosure, the tensile strength, elastic ultimate strength and push-pull toughness of various specifications of alloy wire rods can be effectively improved, and meanwhile, more convenience is provided for the production of alloy wire rods having lower specifications, higher strength and better toughness.

TABLE 5

Test table of properties in solid-liquid doping
Example 2.1 and Comparative Examples 2.1-2.3

| Sample | Specification/μm | Tensile strength/Mpa |
|---|---|---|
| Example 2.1 | 200 | 3170 |
| | 100 | 3880 |
| | 60 | 4370 |
| | 40 | 4895 |
| | 25 | 5280 |
| Comparative Example 2.1 | 200 | 2830 |
| | 100 | \ |
| Comparative Example 2.2 | 200 | 3020 |
| | 100 | \ |
| Comparative Example 2.3 | 200 | 2830 |
| | 100 | \ |

It should be noted that in Table 5, "\" indicates that the specification of a wire rod cannot be further reduced by processing.

According to the test results in Table 5, it can be seen that by using solid-solid doping and a cogging method of multi-roll rolling provided by the present disclosure, the tensile strength, elastic ultimate strength and push-pull toughness of various specifications of alloy wire rods can be effectively improved, and meanwhile, more convenience is provided for the production of alloy wire rods having lower specifications, higher strength and better toughness.

Therefore, the alloy wire rod provided by the present disclosure is used. Due to the addition of oxide of lanthanum and other rare earth elements or rare earth oxides, alloy wire rods having better properties can be obtained, and under further optimization of the process, mass production of alloy wire rods having lower specifications, higher strength and better toughness can be realized.

Therefore, the alloy wire rod provided by the present disclosure or an alloy wire rod prepared by the preparation method provided by the present disclosure can be used in the field of cutting and processing of conventional tungsten wire rods, such as sawing lines and metal meshes made by weaving wire rods into warp wires and weft wires.

The saw lines can be used for cutting a variety of materials, such as silicon wafers, magnetic materials, semiconductor materials and other hard surface materials. The semiconductor materials include sapphire, silicon carbide and other materials for cutting, or the semiconductor materials are cut in combination with related cutting devices. Based on excellent properties in application of cutting, the cutting quality and the cutting efficiency can be effectively improved. The metal meshes can be used for screen printing, probes for inspection, or conducting wires of conduits.

It should be noted that in practical application of the alloy wire rod provided by the present disclosure in the field of cutting, the alloy wire rod can be used as a bus, and electroplated or brazed with particles such as diamonds, so as to be used in cutting and processing of hard surface materials including silicon wafers, sapphire, silicon carbide, other third-generation semiconductor materials, magnetic materials and the like.

The alloy wire rod has been widely used in manufacturing of printed circuit boards, thick-film integrated circuits, solar cells, resistors, capacitors, piezoelectric elements, photosensitive elements, thermosensitive elements, liquid crystal display elements and the like based on screen printing, and the metal meshes formed by the alloy wire rod provided by the present disclosure can also be used in screen printing, so as to replace stainless steel wires for implementation. For example, wire meshes with a small size of less than 18 μm are replaced.

Moreover, based on high tensile strength, elastic ultimate strength and push-pull toughness, and good electrical conductivity and mechanical properties of the alloy wire rod provided by the present disclosure, the alloy wire rod can be applied in the field of cables and ropes of medical/industrial precision instruments. For example, in the application of cables and ropes of various mechanical instruments, the cables can have the highest strength and longest life. For example, in minimally invasive surgical instruments or articulated systems, high loads and bending loads are withstood.

In lifting systems of monocrystalline and polycrystalline silicon furnaces, steel wire ropes are used. With the increase of the lifting weight of the monocrystalline and polycrystalline silicon furnaces, the outer diameter of the steel wire ropes used in the monocrystalline silicon furnace is also increased from 1.8 mm to 4.5 mm. However, under the premise of aiming at less than 30% of a steel wire cutting load, in order to improve the purity and service life of monocrystalline silicon and implant a "magnetic field" in the monocrystalline and polycrystalline silicon furnaces, the steel wire ropes are used in a traditional process. However, the steel wire ropes cannot be applied in a magnetic field, because finished products of monocrystalline rods will be not parallel in crystal direction. Besides, due to a rich Fe content and a high C content of the steel wire ropes, main impurities of monocrystalline silicon are likely to exceed standards, so that requirements for high purity are seriously affected. In addition, with continuous improvement of the quality of the monocrystalline rods, requirements for the tensile force and service life of the ropes in the monocrystalline and polycrystalline silicon furnaces below 1,500° C. are becoming higher.

Therefore, the alloy wire rod provided by the present disclosure can better meet the technical requirements such as high strength, high tensile force, non-magnetic property, high temperature resistance and excellent verticality of a rope in a "lifting system", so that the alloy wire rod can be applied in smelting and casting, monocrystalline furnaces and other aspects in the smelting industry, such as ropes for traction of high-temperature furnaces.

At the same time, due to excellent flexibility and wear resistance as well as excellent tensile strength and fatigue resistance, the alloy wire rod can be used as a material for manufacturing of miniature mechanical wire ropes used in modern surgical robots.

In addition, the alloy wire rod can be used for driving the motion of arms, elbows and wrists of people. The motion of skeletal muscles of a surgeon is driven by a tungsten alloy wire rod, rather than by the body of the doctor like that in the past. In this case, the burden on the doctor can be reduced by a robot, and the doctor will not feel fatigue and tired after performing several operations.

Moreover, with continuous increase of the load withstood by a wire rope in application of medical robots and medical instruments, the structure is also constantly optimized and improved. 1*7, 7*7 and 7*19 structures commonly used in the past have been replaced with more sophisticated stranded silk ropes (such as 7*37, 19*19 and 19*37), so that not only is the tensile strength improved based on the past structures, but also high modulus and excellent flexibility are achieved, and more strict application requirements of modern surgical instruments can be met. More importantly, manufacturing of a wire rope having a diameter of only half a millimeter and a 19*37 structure requires the use of a fine wire having a diameter of only 0.0005 inches, namely 12.7 μm, and the fine wire having such fineness is almost invisible to naked eyes.

In addition, based on the characteristics of lightness, thinness, high strength and high toughness, the alloy wire rod provided by the present disclosure can also be applied to textiles and other technical fields, such as cutting-resistant protective gloves and protective suits. The alloy wire rod has great advantages when applied to cutting-resistant safe protective articles. At present, a tungsten wire for being directly woven into gloves with yarn by an existing process has the specification of 18.5 μm, 30 μm and 40 μm, and the alloy wire rod provided by the present disclosure can be further processed to reach a lower specification of up to 3 μm, so that a product has more excellent softness. Moreover, the product is more light and thin, more comfortable and flexible to wear while the protection grade is increased, and suitable for a variety of labor safety protection occasions. The strength of a high-strength fine tungsten wire is more than 2 times that of a stainless steel wire, and the cutting-resistant grade can be improved by at least 2 levels or above by excellent design, so that the grade can reach A6-A9 of American standards and a high protection grade of F grade of European standards after evaluation.

According to the alloy wire rod provided by the present disclosure, all corresponding requirements for diameter, tensile strength and toughness can be met. Finally, it should be noted that the above embodiments are used only for illustrating the technical solutions of the present disclosure, rather than for limiting the present disclosure. Although the present disclosure has been illustrated in detail with reference to the aforementioned embodiments, persons of ordinary skill in the field shall understand that modifications of the technical solutions recorded in the aforementioned embodiments or equivalent substitutions of some or all of technical features can still be made; and all the modifications or substitutions shall not make the essence of the corresponding technical solutions depart from the scope of the technical solutions of the embodiments of the present disclosure.

The invention claimed is:

1. An alloy wire rod, wherein
   the alloy wire rod is made of a tungsten alloy;
   the tungsten alloy contains tungsten and an oxide of lanthanum;
   the oxide of lanthanum is distributed in the alloy wire rod in lines;
   the alloy wire rod has a wire diameter of equal to or less than 100 μm; and
   the alloy wire rod has a tensile strength of greater than 3,800 MPa.

2. The alloy wire rod according to claim 1, wherein a content of the oxide of lanthanum in the alloy wire rod is 0.1-2.0 wt %.

3. The alloy wire rod according to claim 1, wherein
   the wire diameter of the alloy wire rod is equal to or less than 60 μm;
   the alloy wire rod has an elastic ultimate strength of greater than 2,500 MPa; and
   the tensile strength of the alloy wire rod is greater than 4,200 MPa.

4. The alloy wire rod according to claim 1, wherein the tungsten alloy further contains a metallic element M, and the metallic element M is selected from at least one of potassium, rhenium, molybdenum, iron, cobalt or rare earth metals.

5. The alloy wire rod according to claim 4, wherein a content of the potassium is less than 80 ppm.

6. The alloy wire rod according to claim 1, wherein the tungsten alloy further contains one or more of rare earth oxides other than the oxide of lanthanum.

7. The alloy wire rod according to claim 1, wherein the tungsten alloy further contains a metallic element M, and the metallic element M is selected from at least one of potassium, rhenium, molybdenum, iron or cobalt.

8. A preparation method of the alloy wire rod according to claim 1, comprising doped powder making, pressing, sintering, and cogging, wherein
   the cogging comprises conducting cogging on a sintered billet by a multi-roll rolling process so that a ratio of a longitudinal length of particles of the oxide of lanthanum in a rolled tungsten rod along the alloy wire rod to a particle size of a cross section of the particles is greater than 5.

9. The preparation method of the alloy wire rod according to claim 8, wherein the doped powder making comprises the following steps:
   solid-liquid doping, reduction, and powder making,
   wherein the solid-liquid doping comprises conducting staged drying on a mixed tungsten-doped solution, the staged drying at least comprises 2 temperature stages, and the 2 temperature stages are divided with 100° C. as a division line and comprise heat drying below 100° C. first and then heat drying above 100° C.

10. The preparation method of the alloy wire rod according to claim 9, wherein the staged drying in the solid-liquid doping comprises a first drying stage and a second drying stage, a temperature of the first drying stage is 60-80° C., and a temperature of the second drying stage is 110-150° C.

11. The preparation method of the alloy wire rod according to claim 9, wherein the reduction comprises conducting reduction on a material obtained after the solid-liquid doping to obtain an alloy powder having an average Fisher particle size of 1.0-4.0 μm.

12. The preparation method of the alloy wire rod according to claim 8, wherein the doped powder making comprises the following step:

solid-solid doping, wherein the solid-solid doping comprises using a tungsten powder having a Fisher particle size of 1.0-4.0 μm and the oxide of lanthanum having a particle size distribution D90 of less than 2.0 μm as raw materials, and conducting mixing to obtain a tungsten powder doped with the oxide of lanthanum.

13. The preparation method of the alloy wire rod according to claim 8, wherein a particle size of the oxide of lanthanum in the sintered billet is less than 2.5 μm.

14. An alloy wire rod, wherein the alloy wire rod is made of a tungsten alloy;

the tungsten alloy contains tungsten and an oxide of lanthanum;

the oxide of lanthanum is mainly distributed at a grain boundary of a tungsten main phase of the alloy wire rod;

the alloy wire rod has a wire diameter of equal to or less than 100 μm; and the alloy wire rod has a tensile strength of greater than 3,800 MPa.

15. The alloy wire rod according to claim 14, wherein a content of the oxide of lanthanum in the alloy wire rod is 0.1-2.0 wt %.

16. The alloy wire rod according to claim 14, wherein the alloy wire rod has a wire diameter of equal to or less than 60 μm;

a diameter of a push-pull core wire of the alloy wire rod is less than 350 μm;

the alloy wire rod has an elastic ultimate strength of greater than 2,500 MPa; and the alloy wire rod has a tensile strength of greater than 4,200 MPa.

17. The alloy wire rod according to claim 14, wherein the tungsten alloy further contains a metallic element M, and the metallic element M is selected from at least one of potassium, rhenium, molybdenum, iron, cobalt or rare earth metals.

18. The alloy wire rod according to claim 17, wherein a content of the potassium is less than 80 ppm.

19. The alloy wire rod according to claim 14, wherein the tungsten alloy further contains one or more of rare earth oxides other than the oxide of lanthanum.

20. The alloy wire rod according to claim 14, wherein the tungsten alloy further contains a metallic element M, and the metallic element M is selected from at least one of potassium, rhenium, molybdenum, iron or cobalt.

* * * * *